United States Patent [19]

Buchanan

[11] Patent Number: 4,723,786
[45] Date of Patent: Feb. 9, 1988

[54] BICYCLE FRAME

[75] Inventor: Matthew D. Buchanan, Newton, Ill.

[73] Assignee: Roadmaster Corporation, Olney, Ill.

[21] Appl. No.: 15,440

[22] Filed: Feb. 17, 1987

[51] Int. Cl.⁴ .............................................. B62K 19/34
[52] U.S. Cl. .................................. 280/281 R; 280/259
[58] Field of Search ............... 280/281 R, 281 B, 282, 280/259, 260; 411/527

[56] References Cited

U.S. PATENT DOCUMENTS

| 2,284,624 | 6/1942 | Schwinn | 280/281 R |
| 2,644,345 | 7/1953 | Sebel | 280/259 |
| 3,551,004 | 12/1970 | Quisenberry | 280/281 R |

Primary Examiner—John J. Love
Assistant Examiner—Donn McGiehan
Attorney, Agent, or Firm—Polster, Polster and Lucchesi

[57] ABSTRACT

A bicycle frame with a down tube, seat mast, and rear fork has a crank hanger in the form of an open bottomed bell having substantially planar front, top and rear surfaces substantially perpendicular to long axes of the lower ends of the down tube, seat mast and rear fork respectively and parallel to end surfaces thereof, the end surfaces squarely butting the respective bell surfaces and being secured thereto. A crank bearing assembly is readily mounted in the crank hanger, and held therein with a single cotter pin, permitting easy demounting as well. The axle shaft of a crank is journaled in bearings mounted in housings of a size to fit closely within an enlarged portion of key hole slots in opposite parallel side walls of the bell, but too large to pass through neck portions of the key hole slots.

8 Claims, 13 Drawing Figures

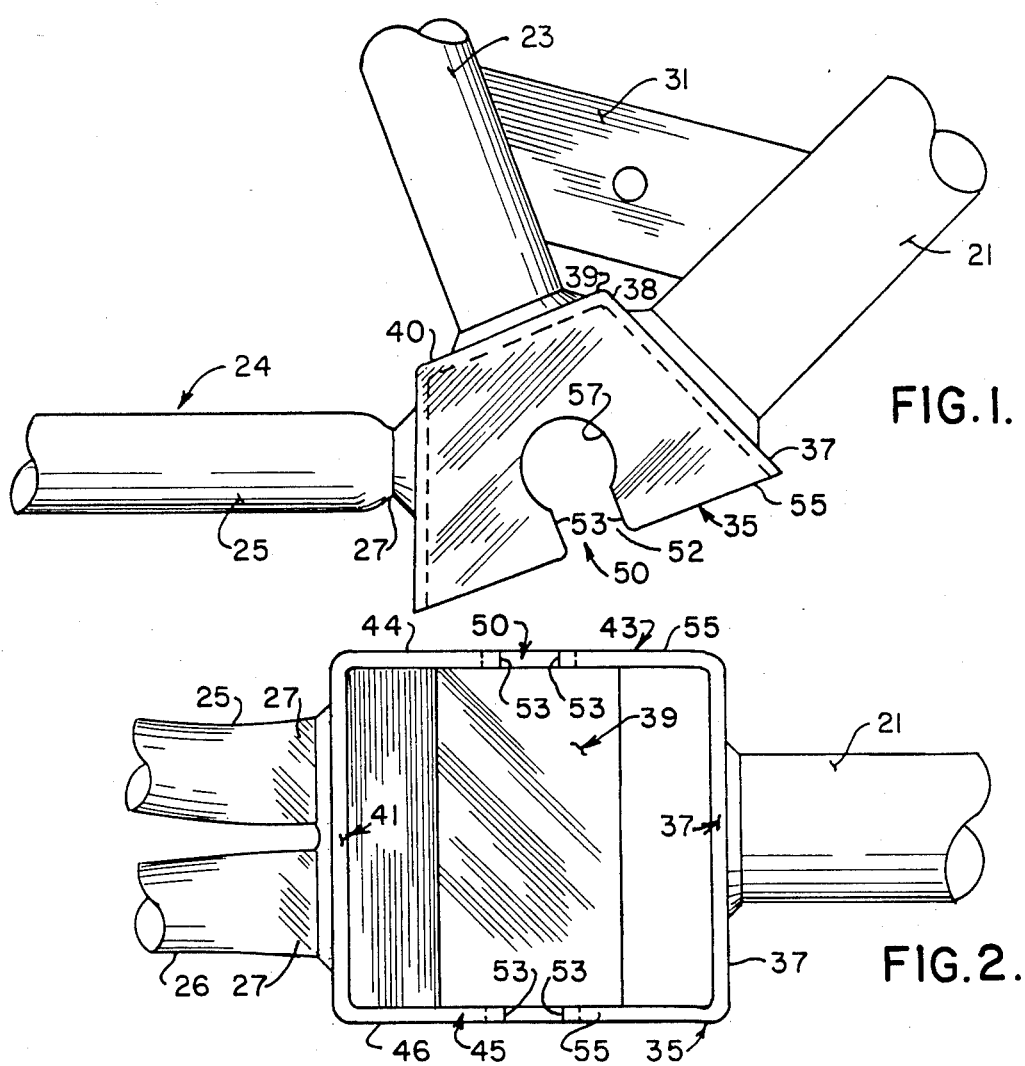
FIG.1.
FIG.2.
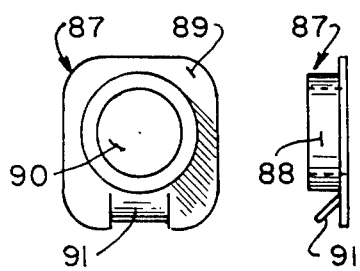
FIG.3. FIG.3A.
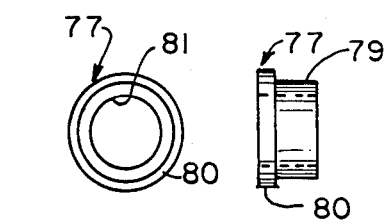
FIG.4. FIG.4A.
FIG.5.
FIG.5A.
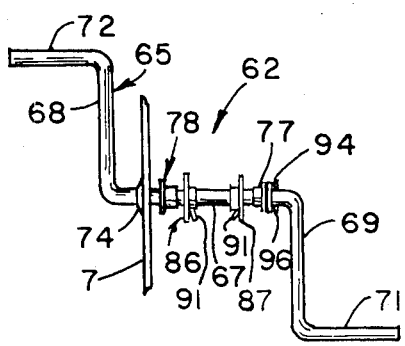
FIG.6.

BICYCLE FRAME

BACKGROUND OF THE INVENTION

This invention has particular application to sidewalk bikes, but is not limited thereto. Such bicycles conventionally have a down tube, seat mast, and rear fork, ends of which are mounted to the cylindrical outside surface of a circumferentially closed, cylindrical crank hanger.

Such an arrangement requires the notching or shaping of the ends of the tubes of which the frame is made, and the welding or brazing of the ends on a compound curve. It also requires that the pedal shafts be mountable on and demountable from the outer ends of the crank arms, so that one of the crank arms can be inserted through the crank hanger in mounting or demounting the crank assembly.

One of the objects of this invention is to provide a frame construction that eliminates the need for notching of the frame tubes, eliminates the use of special bolts and nuts for the mounting of pedals, allows for easy assembly of the crank and permits easy replacement of parts of the crank assembly.

Other objects will become apparent to those skilled in the art in the light of the following description and accompanying drawing.

SUMMARY OF THE INVENTION

In a bicycle having a down tube, a seat mast, a rear fork and a crank hanger, an open bottomed crank hanger bell is provided having substantially planar front, top and rear surfaces substantially perpendicular to long axes of the lower ends of the down tube, seat mast and rear fork respectively and parallel to end surfaces thereof. The end surfaces squarely abut the respective bell surfaces and are secured thereto. In the preferred embodiment, the crank hanger bell has parallel side walls, with transversely aligned key hole slots. The key hole slots have a neck portion opening through a lower, free edge of the side walls and an enlarged portion within the ambit of the side wall. The crank bearing assembly includes bearing housings, with a part of a size to fit closely within the enlarged portions of the key hole slots, but too large to pass through the neck portions. The neck portions are wide enough to admit the axle shaft part of the crank. This permits the use of a one piece crank, with pedal shafts integral with crank arms. The crank assembly can easily be installed in the crank hanger, and held by a single cotter pin or the like.

BRIEF DESCRIPTION OF THE DRAWINGS

In the drawings,

FIG. 1 is a fragmentary view in side elevation of a frame constructed in accordance with one embodiment of this invention;

FIG. 2 is a bottom plan view;

FIG. 3 is a view in front elevation of a crank bearing housing;

FIG. 3a is a view in side elevation of the housing shown in FIG. 3;

FIG. 4 is a view in front elevation of a plastic bearing;

FIG. 4a is a view in side elevation of the plastic bearing shown in FIG. 4;

FIG. 5 is a view in front elevation of a flat washer;

FIG. 5a is a view in side elevation of the flat washer shown in FIG. 5;

FIG. 6 is a view of a crank and crank hanger assembly, reduced in size;

DESCRIPTION OF THE PREFERRED EMBODIMENT

Figure 7:
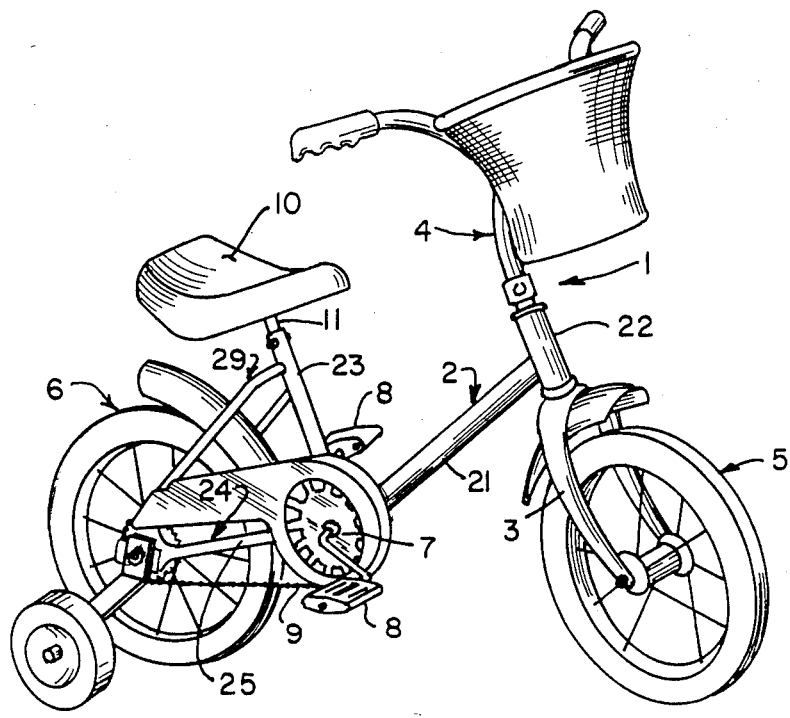
FIG. 7 is a view of a sidewalk bike with a frame of one embodiment of this invention.

Referring now to the drawing for one illustrative embodiment of this invention, FIG. 7 is a view in perspective of a typical sidewalk bike type bicycle 1, to which the frame of the present invention has application. Such a bicycle has a frame 2, a front fork 3, handlebars 4, a front wheel 5, a rear wheel 6, a drive spocket 7, pedals 8, a chain 9, and a seat 10 mounted on a seat post 11. Except for the frame 2, the elements that have been recited broadly are conventional.

The frame 2 of the present invention includes a down tube 21, with a conventional head tube 22 at its upper end, a seat mast 23 which receives the seat post 11 at its upper end, and a rear fork 24, which, in this embodiment, is made up of substantially mirror image rear fork lower bars 25 and 26. The down tube 21, seat mast 23, and rear fork bars 25 and 26 are cylindrically tubular. The down tube 21 and head tube 22 are uniformly circular in transverse cross-section, but the rear fork bars 25 and 26, in this embodiment, are flattened at their inner ends 27 in their vertical dimension, as shown particularly in FIG. 1, and therefore spread transversely, as shown in FIG. 2. The rear fork lower bars 25 and 26 are flattened transversly at their outboard ends, and have rear fork end plates, not here shown, secured to them in conventional fashion. An upper rear fork bar assembly 29 is brazed or welded to the seat mast at its upper end and to the rear fork end plate at its lower ends, in a conventional way, to serve as a brace. A gusset 31 secured to and between the down tube 21 and the seat mast 23 also serves as a reinforcing member.

Figure 8:
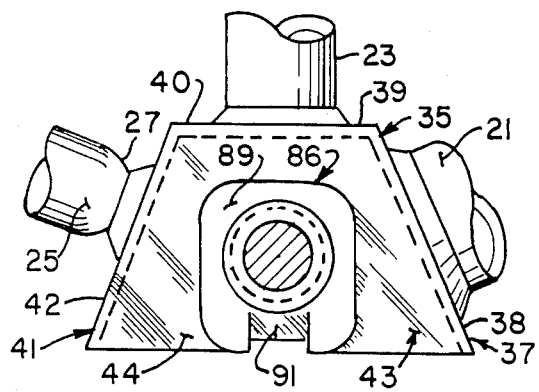
FIG. 8 is a fragmentary view in side elevation of the frame of FIG. 1 with a crank hanger assembly mounted within the crank hanger shown in FIG. 1, the crank axle shaft being shown in section.
Figure 9:
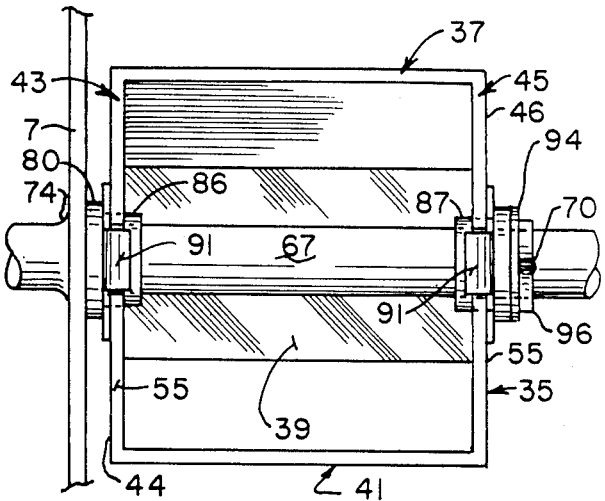
FIG. 9 is a fragmentary bottom plan view of the crank hanger and crank assembly shown in FIG. 8.
Figure 10:
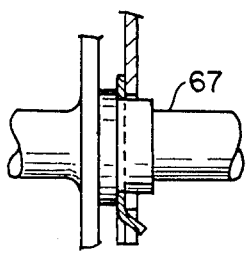
FIG. 10 is a fragmentary view in side elevation, partly in section, showing a detail of the mounting of a crank bearing housing in the crank hanger of FIGS. 8 and 9.

An important element of this invention is a crank hanger bell 35. In this embodiment, the crank hanger bell is substantially trapezoidal in side elevation, as shown in FIGS. 1 and 8, and square in bottom plan. The bell 35 has a front wall 37 with a planar outer surface 38, a top wall 39 with a planar outer surface 40, a rear wall 41 with a planar outer surface 42, a side wall 43 with a planar outer surface 44, and a side wall 45, with a planar outer surface 46. The walls 43 and 45 are parallel to one another, and each has a key hole slot 50, with a neck portion 52 defined by parallel edges 53, extending through a lower, free edge 55 of the side wall, and an enlarged portion 57, circular in side elevation. The key hole slots 50 of the two side walls 43 and 45 are aligned transversely.

A crank hanger assembly 62 is mounted in the crank hanger bell 35. The crank hanger assembly 62 includes a crank 65, made up of an axle shaft 67, crank arms 68 and 69 integral with the axle shaft and extending at right angles from the opposite ends of the axle shaft in diametrically opposite directions, and pedal shafts 71 and 72, integral with the crank arms and projecting at right angles from the crank arms in a direction parallel to the axis of the axle shaft 67. The drive sprocket 7 is, in this embodiment, welded to the axle shaft 67 near the crank arm 68, by means of a weld 74 on the outboard side of the sprocket, between the sprocket and the arm 68. The axle shaft 67 is journaled in plastic bearings 77 and 78. The bearings 77 and 78 are identical. Each has a cylindrical body part 79, with a radially extending flange 80 at one end and an axle shaft passage 81 of uniform diameter extending entirely through the bearing. The assembly 62 also includes crank bearing housings 86 and 87. The housings 86 and 87 are identical. Each has a cylindrical bearing body receiving sleeve 88, and integral with one end, a flat plate 89. A passage 90 extends through the sleeve 88 and flat plate 89. A locating tab 91 is lanced from a lower margin of the flat plate 89, and bent in a direction toward the sleeve 88, as shown in FIGS. 3, 6, 8, 9 and 10. The tab 91 is of a width to fit closely between the edges 53 of the neck of the key hole slot. The assembly 62, in this embodiment, also includes one or more flat washers 94 of a size to receive the axle shaft 67, and a cotter pin 96.

The angles of the outer surface 38 of the front wall 37 of the crank hanger bell 35 and of the outer surface 42 of the rear wall 41, with respect to the surface 40 of the top wall 39 are such that the lower ends of the down tube 21 and the seat mast 23 and the inner ends of the rear fork bars 25 and 26 can each be in a plane perpendicular to the axis of the tubes from which they are made, at the ends of the tubes, and can be butted squarely against the respective surfaces, and welded in a simple weld in a single plane, as shown particularly in FIG. 1. This produces a strong joint in a simple manner.

In mounting the crank assembly 62, the various elements are assembled as shown in FIG. 6, except for the cotter pin 96. The bearing 78 is slid onto the axle shaft 67, oriented with its flange 80 next to the sprocket 7. Next, the bearing housing 86 is mounted on the axle shaft with its sleeve 88 extending in the direction away from the sprocket 7. Next, the bearing housing 87 is mounted on the axle shaft, with its sleeve 88 directed toward the sprocket 7, and then the bearing 77 is mounted on the axle shaft with its body part 79 directed toward the sprocket 7. All of these elements are then moved apart far enough to clear the outer surfaces 44 and 46 of the side walls 43 and 45, and to permit the insertion of the axle shaft 67 through the necks 52 of the key hole slots 50 and into the area of the enlarged portion 57. The body parts 79 of the plastic bearings are inserted into the bearing body receiving sleeves 88 of the crank bearing housings 86 and 87 until the flanges 80 engage the outside flat surface of the flat plate 89 of their respective bearing housings. The bearing housings are oriented so that the tabs are in position to move into the necks 52, and the cylindrical bearing body receiving sleeves are moved into the enlarged portions of the key hole slots. Preferrably, pressure is first applied to the sprocket until the sleeve of the housing 86 snaps into the bell, and the other housing is gently snapped into the opposite slot by using pliers, if necessary. The inner surfaces of the flat plates 89 fit flat against the planar outer surfaces of the side walls 43 and 45. One or more of the flat washers 94 can then be mounted with the inner one against the outer radial surface of the flange 80 of the bearing 77, and the outer radial surface of the washer or washers 94 closely adjacent the cotter pin hole 70 when the inboard surface of the sprocket 7 is against the outboard radial face of the flange 80 of the bearing 78 adjacent it. The cotter pin 96 is then inserted in the diametric cotter pin hole 70, and the ends of the cotter pin bent over to hold the pin in place and to hold the axle shaft 67 from shifting more than slightly in its axial direction. As can be appreciated, a small amount of play is to be expected, but not enough to permit the bearings to move axially an appreciable amount.

In the preferred embodiment, the pedals 8 are unitary plastic pedals with a passage to receive the pedal shafts 71 and 72. The passage is interrupted midway of its long axis, by a slot transverse of the long axis, in which a retaining ring is put. The pedals are mounted on the pedal shafts by introducing the pedal shafts into the passage and forcing the pedal and retaining ring into the desired position, the retaining ring frictionally engaging the pedal shaft and restraining the pedal from moving inwardly or outwardly from the desired position.

The construction of the frame and mounting of the crank hanger assembly of this invention, as exemplified by the preferred embodiment described, have many advantages. Among them, are the elimination of the notching or shaping of the ends of the frame tubes, the facilitating of the welding process, the elimination of special bolts and nuts for pedals, the easy assembly of the crank hanger assembly and its mounting in the crank hanger bell, which permits its being assembled by the ultimate user and the easy replacement of elements that are worn out or damaged in use. It also allows the use of less expensive bearings while giving equally good bearing surfaces for the crank axle shaft, and eliminates the flattening and piercing of both sides of the crank arms to receive a special pedal shaft bolt. It also permits, although it does not require, that the entire crank hanger assembly and pedals can be preassembled, leaving only the cotter pin to be inserted after the assembly has been inserted into the bell.

Numerous variations in the construction of the frame of this invention, within the scope of the appended claims, will occur to those skilled in the art in the light of the foregoing disclosure. Merely by way of example, the crank hanger bell can be made with the front, rear and side walls integral with the top walls, and bent down and welded along the meeting edges of the front and side walls and rear and side walls, or it can be made by drawing from sheet stock. The bearing housing can also be made by piercing or punching, and drawing, from sheet stock. The size and angles of the hanger bell can be varied, as long as the outer surfaces present a substantially planar surface to butt the ends of the down tube and seat mast. The use of the bell does not preclude the use of a one piece rear fork, U shaped in plan, with a flattened surface at the outside of the bottom of the U, although the preferred embodiment has advantages. The various tubes can be braised or otherwise secured. The bearings can be of types different from the one-piece plastic sleeve type bearings described, carried by the bearing housings. The crank assembly retaining means can be different from the cotter pin, such, for example, as a groove in the axle shaft, and a C-ring in the groove, although the cotter pin passage and cotter pin have the advantage of simplicity and require no special tools. The shape of the key hole slot can be varied so long as the neck of the slot accommodates the axle shaft and the flat plate portion of the bearing housing can be shaped differently. These are merely illustrative, and not by way of limitation.

Having thus described the invention, what is claimed and desired to be secured by Letters Patent is:

1. In a bicycle having a down tube, a seat mast, a rear fork and a crank hanger, the improvement comprising an open-bottomed crank hanger bell with side walls trapezoidal in elevation and front, rear and top walls substantially rectangular in elevation, said front and top walls having substantially planar outside surfaces substantially perpendicular to long axes of the lower ends of said down tube and said seat mast respectively and parallel to end surfaces thereof, said end surfaces squarely butting the respective bell surfaces and being secured thereto; and means for mounting a crank bearing assembly in and demounting it from said crank hanger bell.

2. The improvement of claim 1 wherein the rear fork has two, substantially mirror image bars, inner ends of both of said bars squarely butting a substantially planar outside surface of the rear wall of said bell and being secured thereto.

3. The improvement of claim 1 wherein said crank hanger bell has side walls parallel to one another, said side walls having tranversely aligned key hole slots with neck portions opening through a lower, free edge thereof, and enlarged portions within the ambit of said side walls, and said crank bearing assembly includes bearing housings having bearing receiving portions of a size to fit closely within said enlarged portions but too large to pass through said neck portions.

4. In a bicycle having a down tube, a seat mast, a rear fork and a crank hanger, the improvement comprising an open-bottomed crank hanger bell having substantially planar front and top surfaces substantially perpendicular to long axes of the lower ends of said down tube and said seat mast respectively and parallel to end surfaces thereof, said end surfaces squarely butting the respective bell surfaces and being secured thereto; and means for mounting a crank bearing assembly in an demounting it from said crank hanger bell, said crank hanger bell having side walls parallel to one another, said side walls having transversely aligned key hole slots with neck portions opening through a lower, free edge thereof, and enlarged portions within the ambit of said side walls, and said crank bearing assembly including bearing housings having bearing receiving portions of a size to fit closely within said enlarged portions but too large to pass through said neck portions, each of said crank bearing assembly bearing housings having an inboard section in which a bearing with an axially directed passage is mounted, said inboard section being embraced by said enlarged portion of said keyhole slot, and a plate integral with said inboard section, extending substantially perpenduclarly from the axis of said passage at an outboard end of said housing, said plate having a bearing-receiving opening in it concentric with said bearing passage, and said plate having a locking tab extending into said key hole slot neck portion.

5. The improvement of claim 4 wherein each of said bearings is a one-piece plastic sleeve-type bearing with an outboard, outwardly extending flange, a radially inner surface of which abuts the outboard surface of one of the bearing housing plates, one of said bearing flanges being contiguous an inboard surface of a drive sprocket, the other being adjacent retaining means mounted on an axle shaft of a crank.

6. The improvement of claim 5 wherein the retaining means comprises a cotter pin extending through a cotter pin passage extending diametrically through said axle shaft outboard of said other bearing flange.

7. In a bicycle having a down tube, a seat mast, a rear fork and a crank hanger, the improvement comprising an open-bottomed crank hanger bell having substantially planar front and top surfaces substantially perpendicular to long axes of the lower ends of said down tube and said seat mast respectively and parallel to end surfaces thereof, said end surfaces squarely butting the respective bell surfaces and being secured thereto, said rear fork having two, substantially mirror image bars, inner ends of both of said bars squarely butting a substantially planar rear surface of said bell and being secured thereto, said crank hanger bell having side walls parallel to one another, said side walls having transversely aligned key hole slots with neck portions opening through a lower, free edge thereof, and enlarged portions within the ambit of said side walls, and said crank hanger assembly comprising a one-piece crank with an axle shaft, crank arms integral with the axle shaft at both ends thereof and pedal shafts integral with ends of the said crank arms, a drive sprocket secured to said axle shaft near one end thereof and means for accomodating retaining means near the other end thereof, crank bearing assembly bearing housings each having an inboard, bearing-receiving section, said inboard section being embraced by said enlarged portion of said keyhole slot, and a plate integral with said inboard section, extending substantially perpendicularly from the axis of said passage at an outboard end of said housing, said plate having a bearing-receiving opening in it concentric with said bearing passage, and said plate having a locking tab extending into said key hole slot neck portion, one-piece plastic bearings mounted in said bearing receiving portions of said bearing housings, each of said bearings being a one-piece plastic sleeve-type bearing with an inboard part in which said axle shaft is journalled and an outboard, radially outwardly extending flange, a radially inner surface of which abuts the outboard surface of one of the bearing housing plates, one of said bearing flanges being contiguous an inboard surface of said drive sprocket, the other being adjacent retaining means mounted in said retaining means accomodating means of said axle shaft.

8. The improvement of claim 7 wherein the retaining means comprises a cotter pin extending through a cotter pin passage extending diametrically through said axle shaft outboard of said other bearing flange.

* * * * *